United States Patent
Lee

(10) Patent No.: US 7,719,603 B2
(45) Date of Patent: May 18, 2010

(54) AUTOMATIC FOCUSING METHOD FOR CAMERA PERFORMING ADDITIONAL SCANNING

(75) Inventor: Byoung-kwon Lee, Seongnam-si (KR)

(73) Assignee: Samsung Digital Imaging Co., Ltd., Suwon-si (KR)

( * ) Notice: Subject to any disclaimer, the term of this patent is extended or adjusted under 35 U.S.C. 154(b) by 916 days.

(21) Appl. No.: 11/007,016

(22) Filed: Dec. 8, 2004

(65) Prior Publication Data
US 2005/0134720 A1 Jun. 23, 2005

(30) Foreign Application Priority Data
Dec. 19, 2003 (KR) .............. 10-2003-0093764

(51) Int. Cl.
*H04N 5/232* (2006.01)
(52) U.S. Cl. .............. 348/345; 348/349; 348/354; 348/356
(58) Field of Classification Search .......... 348/345–357
See application file for complete search history.

(56) References Cited

U.S. PATENT DOCUMENTS

| 4,482,234 A | * | 11/1984 | Takagi et al. ................. 396/103 |
| 4,509,842 A | * | 4/1985 | Taniguchi et al. ............. 396/81 |
| 4,903,134 A | * | 2/1990 | Murashima et al. ......... 348/347 |
| 5,119,121 A | * | 6/1992 | Kobayashi et al. ............ 396/80 |
| 6,970,646 B2 | * | 11/2005 | Hirai ........................... 396/91 |
| 2001/0010556 A1 | * | 8/2001 | Sugimoto et al. ........... 348/345 |
| 2003/0081137 A1 | * | 5/2003 | Yamazaki .................... 348/354 |
| 2003/0165333 A1 | * | 9/2003 | Shinohara .................... 396/72 |

FOREIGN PATENT DOCUMENTS

JP 06-121216 A 4/1994

OTHER PUBLICATIONS

Office Action established for CN 200410104690.1 (Feb. 29, 2008).

\* cited by examiner

*Primary Examiner*—Sinh Tran
*Assistant Examiner*—Paul Berardesca
(74) *Attorney, Agent, or Firm*—Drinker Biddle & Reath LLP

(57) ABSTRACT

An automatic focusing method for a camera, including scanning in a macro mode, scanning in a normal mode, and additional scanning. In the scanning in the macro mode, a region within a first distance is scanned if the macro mode is set by a user. In the scanning in the normal mode, a region beyond the first distance is scanned if the normal mode is set by the user. In the additional scanning, the scanning in the normal mode is performed additionally if it is determined that the position of the focus lens found in the scanning in the macro mode does not have the largest focus value, and the scanning in the macro mode is performed additionally if it is determined that the position of the focus lens found in the scanning in the normal mode does not have the largest focus value.

18 Claims, 12 Drawing Sheets

AUTOMATIC FOCUSING METHOD FOR CAMERA PERFORMING ADDITIONAL SCANNING

This application claims the priority of Korean Patent Application No. 2003-93764, filed on Dec. 19, 2003, in the Korean Intellectual Property Office, the disclosure of which is incorporated herein in its entirety by reference.

BACKGROUND OF THE INVENTION

1. Field of the Invention

The present invention relates to an automatic focusing method for a camera, and more particularly, to an automatic focusing method for a camera in which a focus motor is driven step by step and a position of a focus lens at which the largest focus value proportionate to an amount of high frequency components in an image signal is found.

2. Description of the Related Art

For automatic focusing of a conventional camera, for example, a digital camera, such as Digimax 350SE manufactured by Samsung Techwin Co., Ltd., a user has to press a shutter button and the user has to select either a macro mode or a normal mode.

The macro mode is appropriate when a subject is within a first distance, for example, 30 cm through 80 cm, from a focus lens. If the macro mode is set by a user, automatic focusing is performed in a region within the first distance. The normal mode is appropriate when the subject is beyond the first distance, for example, 80 cm through infinity, from the focus lens. If the normal mode is set by the user, automatic focusing is performed in a region beyond the first distance.

In such a conventional automatic focusing method described above, users set the macro mode or the normal mode. However, most users may have difficulty deciding whether the macro mode or the normal mode is appropriate for a current position of a subject. If a user fails to set a mode properly, the accuracy of automatic focusing may be undermined.

SUMMARY OF THE INVENTION

The present invention provides an automatic focusing method which can enhance the accuracy of automatic focusing even if a user fails to select a proper mode between a macro mode and a normal mode.

According to an aspect of the present invention, there is provided an automatic focusing method for a camera, typically having a focus motor driven in a step by step manner, in which scanning is performed to find a position of a focus lens having the largest focus value proportional to an amount of high frequency components in an image signal, and a final position of the focus lens is set according to the result of the scanning. The method includes scanning in a macro mode, scanning in a normal mode, and additional scanning. In the scanning in the macro mode, a region within a first distance is scanned if the macro mode, appropriate for a state in which the subject is within the first distance from the focus lens, is set by a user. In the scanning in the normal mode, a region beyond the first distance is scanned if the normal mode, appropriate for a state in which the subject is beyond the first distance from the focus lens, is set by the user. In the additional scanning, the scanning in the normal mode is performed additionally if it is determined that the position of the focus lens found in the scanning in the macro mode does not have the largest focus value, and the scanning in the macro mode is performed additionally if it is determined that the position of the focus lens found in the scanning in the normal mode does not have the largest focus value.

In the method, since additional scanning is performed adaptively, even if a user fails to select a proper mode between the macro mode and the normal mode, the accuracy of automatic focusing can be improved.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
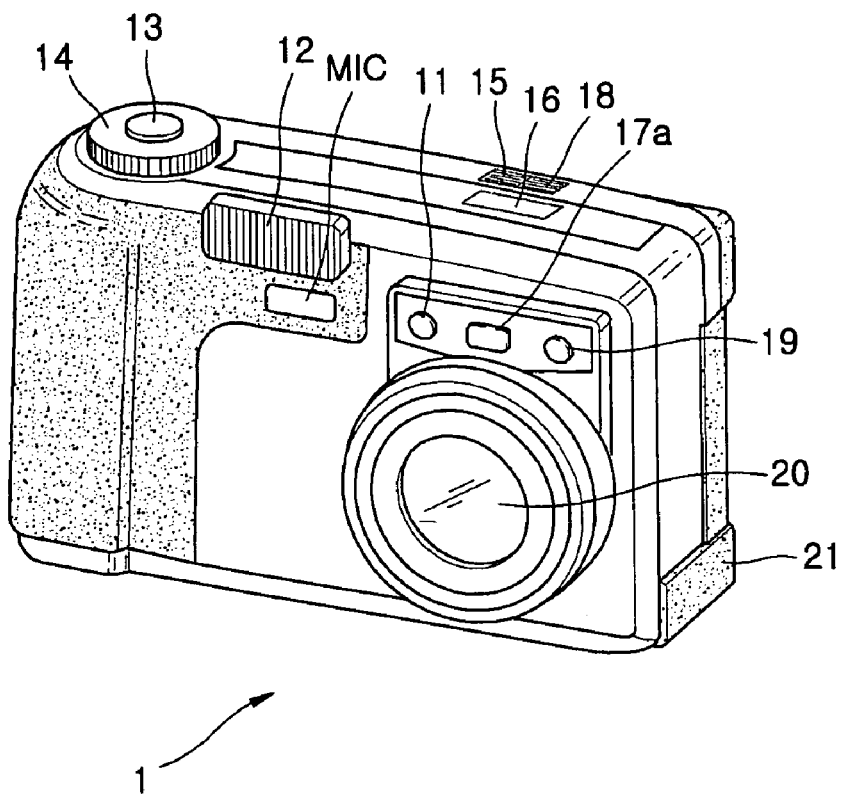
FIG. 1 is a perspective view illustrating the front and the top of a digital camera according to the present invention.

Referring to FIG. 1, the front and top of a digital camera 1 according to the present invention include a microphone MIC, a self-timer lamp 11, a flash 12, a shutter button 13, a mode dial 14, a function-selection button 15, a photographing information display 16, a viewfinder 17a, a function-block button 18, a flash light intensity sensor 19, a lens unit 20, and an external interface unit 21.

In a self-timer mode, the self-timer lamp 11 operates for a set period of time from the time when the shutter button 13 is pressed to the time when a shutter operates.

The mode dial 14 is used for selecting and setting operating modes of the digital camera 1, such as a still-image photographing mode, a night view photographing mode, a moving-image photographing mode, a reproducing mode, a computer connection mode, and a system setting mode. The function-selection button 15 is used for selecting any one of the operating modes of the digital camera 1.

The photographing information display 16 displays information regarding functions related to photographing. The function-block button 18 is used when a user selects one of the functions displayed on the photographing information display 16.

Figure 2:
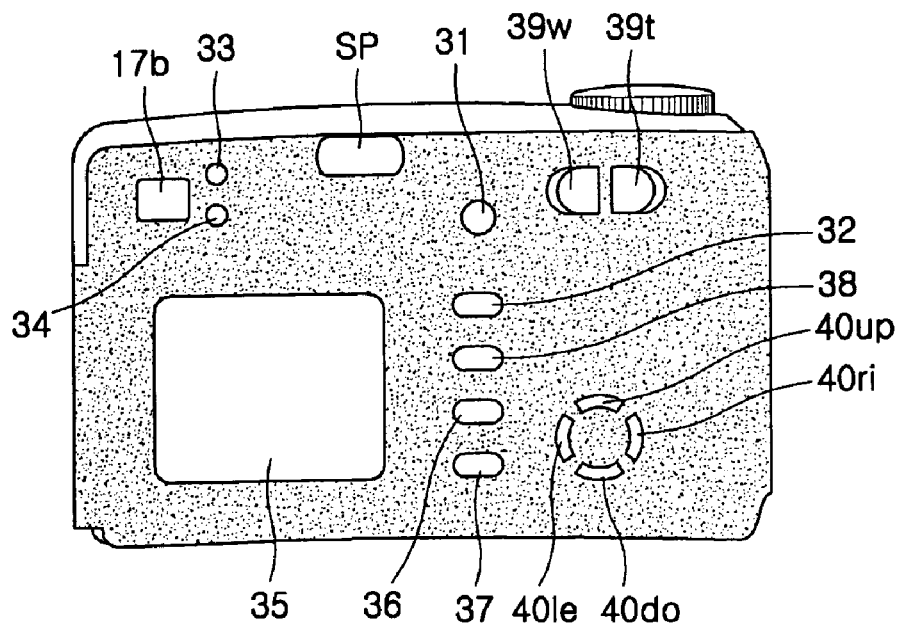
FIG. 2 is a perspective view illustrating the back of the digital camera of FIG. 1.

Referring to FIG. 2, the back of the digital camera 1 includes a speaker SP, a power button 31, a monitor button 32, an automatic focusing light 33, a viewfinder 17*b*, a flash standby light 34, a color LCD panel 35, a confirm/delete button 36, an enter/reproduce button 37, a menu button 38, a wide angle-zoom button 39*w*, a telephoto-zoom button 39*T*, an up button 40*up*, a right button 40*ri*, a down button 40*do*, and a left button 40*le*.

The monitor button 32 is used for controlling the operation of the color LCD panel 35. For example, when the user presses the monitor button 32, an image and photographing information are displayed on the color LCD panel 35. When the user presses the monitor button 32 again, only the image is displayed on the color LCD panel 35. When the user presses the monitor button 32 three times, the color LCD panel 35 is turned off.

The automatic focusing light 33 operates when automatic focusing is completed. The flash standby light 34 operates when the flash 12 of FIG. 1 is in a standby mode. The confirm/delete button 36 is used for confirmation or deletion in the process of setting a mode. The enter/reproduce button 37 is for inputting data, or for stop or reproduction in a reproducing mode. The menu button 38 is used to display menus for a mode selected from the mode dial 14. The up button 40*up*, right button 40*ri*, the down button 40*do*, and the left button 40*le* are used in the process of setting a mode.

Figure 3:
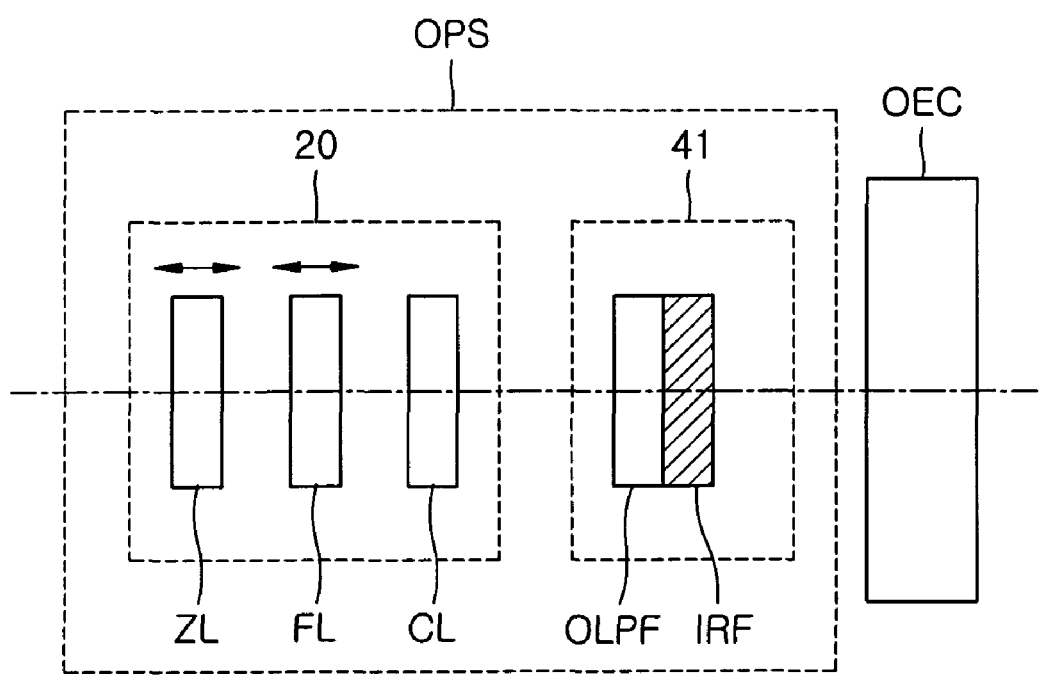
FIG. 3 illustrates the structure of a portion of the digital camera 1 of FIG. 1 on which light is incident.
Figure 4:
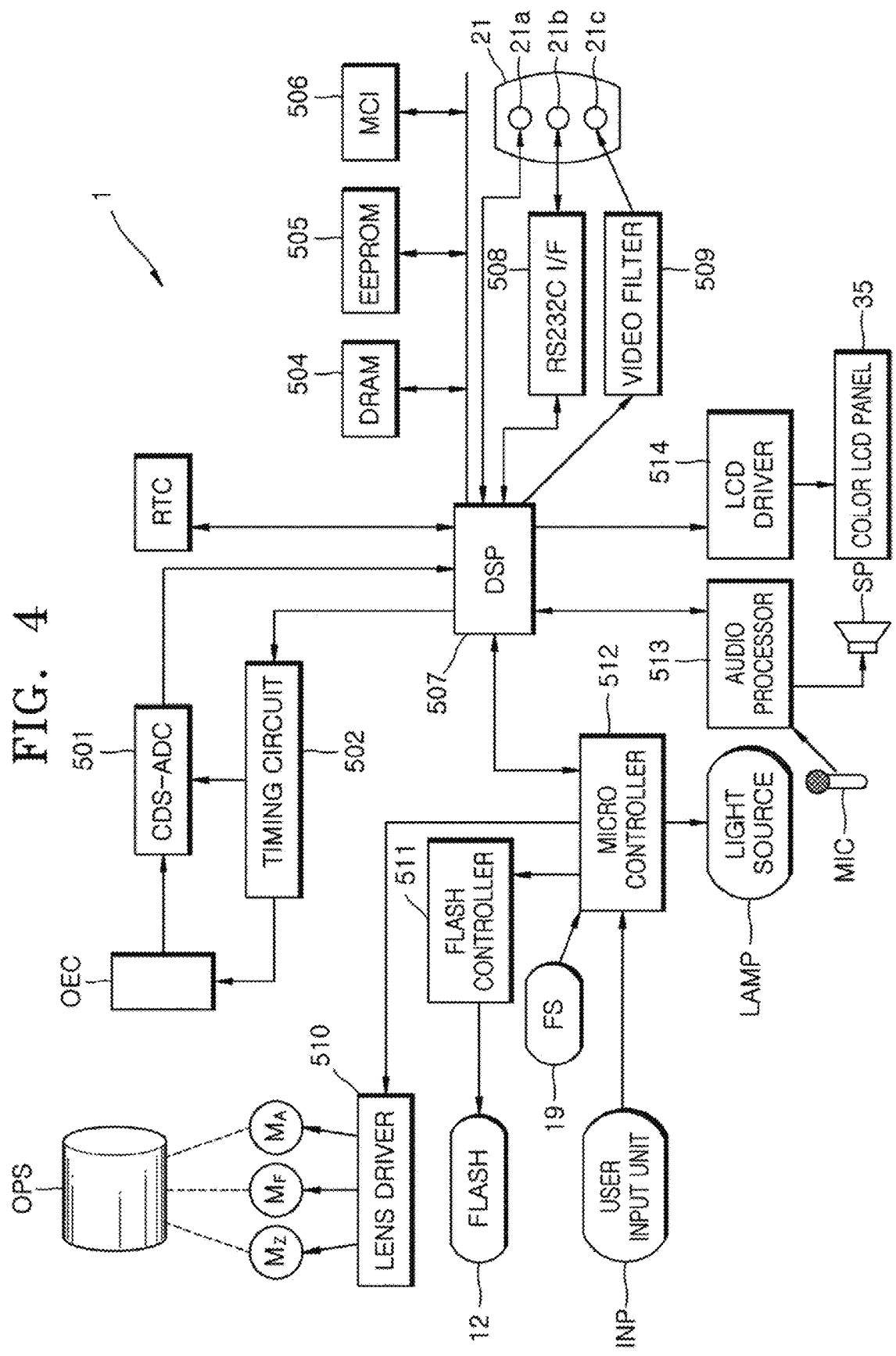
FIG. 4 is a schematic diagram of the entire configuration of the digital camera of FIG. 1.

FIG. 3 illustrates the structure of a portion of the digital camera 1 of FIG. 1 on which light is incident. FIG. 4 is a schematic diagram of the entire configuration of the digital camera of FIG. 1. The entire configuration of the digital camera 1 of FIG. 1 will now be described with reference to FIGS. 3 and 4.

An optical system (OPS) including the lens unit 20 and a filter unit 41 optically processes light. The lens unit 20 includes a zoom lens ZL, a focus lens FL, and a compensation lens CL.

When the user presses the wide angle-zoom button 39*w* or the telephoto-zoom button 39*T* included in a user input unit (INP), a signal corresponding to the wide angle-zoom button 39*w* or the telephoto-zoom button 39*T* is relayed to a micro-controller 512. The micro-controller 512 controls a lens driver 510, thereby running a zoom motor $M_Z$, which in turn, moves the zoom lens ZL. In other words, when the user presses the wide angle-zoom button 39*w*, the focal length of the zoom lens ZL becomes short, thereby widening the angle of view. When the user presses the telephoto-zoom button 39*T*, the focal length of the zoom lens ZL becomes long, thereby narrowing the angle of view. Since the position of the focus lens FL is adjusted in a state where the position of the zoom lens ZL is set, the angle of view is hardly affected by the position of the focus lens FL.

If a subject is automatically or manually focused on, the position of the focus lens FL changes with respect to a subject distance Dc. Since the position of the focus lens FL is adjusted when the position of the zoom lens ZL is set, the subject distance Dc is affected by the position of the zoom lens ZL.

In an automatic focusing mode, a main controller built into a digital signal processor (DSP) 507 controls the lens driver 510 through the micro controller 512, thereby driving a focus motor $M_F$. Accordingly, the focus lens FL can be moved by a predetermined distance, and, in this process, the position of the focus lens FL at which a focus value proportionate to the amount of high frequency components contained in an image signal, for example the number of position steps of the focus motor $M_F$, is largest can be set.

The compensation lens CL is not separately operated because the compensation lens CL compensates for the entire refractive index. Reference numeral $M_A$ indicates a motor driving an aperture (not shown). The aperture-driving motor $M_A$ has different rotation angles when in a designated exposure mode and when not in the designated exposure mode. In the designated exposure mode, if a region desired by a user in a region where a subject is located matches a designated detection region displayed on the color LCD panel 35 of the digital camera 1, the exposure of the digital camera 1 is set according to an average luminance of the designated detection region.

An optical low pass filter (OLPF) included in the filter unit 41 of the OPS eliminates high frequency optical noise. An infrared cut filter (IRF) included in the filter unit of the OPS blocks the infrared component of incident light.

A photoelectric conversion unit (OEC) of a charge coupled device (CCD) or a complementary metal oxide semiconductor (CMOS) converts light from the OPS into an analog electrical signal. Here, the DSP 507 controls a timing circuit 502 to control the operations of the OEC and a correlation-double-sampler-and-analog-to-digital converter (CDS-ADC) 501. The CDS-ADC 501 processes an analog signal from the OEC, eliminates the high frequency noise, adjusts the amplitude of the analog signal, and then converts the analog signal into a digital signal.

The DSP 507 processes the digital signal from the CDS-ADC 501 and generates a digital image composed of luminance and chromaticity values. The DSP 507 performs a photographing control algorithm illustrated in FIG. 5.

A light source (LAMP) operated by the micro-controller 512 includes the self-timer lamp 11, the automatic focusing light 33, and the flash standby light 34. The INP includes the shutter button 13, the mode dial 14, the function-selection button 15, the function-block button 18, the monitor button 32, the confirm/delete button. 36, the enter/reproduce button 37, the menu button 38, the wide angle-zoom button 39*w*, the telephoto-zoom button 39*T*, the up button 40*up*, the right button 40*ri*, the down button 40*do*, and the left button 40*le*.

A dynamic random access memory (DRAM) 504 temporarily stores a digital image signal from the DSP 507. An electrically erasable and programmable read only memory (EEPROM) 505 stores algorithms and setting data needed for the operation of the DSP 507. A user's memory card is inserted or removed in a memory card interface 506. The digital image signal from the DSP 507 is input to an LCD driver 514, thereby displaying an image on the color LCD panel 35.

The digital image signal from the DSP 507 can be transmitted via a universal serial bus (USB) connector 21*a* or via an RS232C. interface 508 and an RS232C connector 21*b* for serial communications. The digital image signal from the DSP 507 can also be transmitted via a video filter 509 and a video output unit 21*c* as a video signal.

An audio processor 513 can relay sound from the microphone MIC to the DSP 507 or to a speaker SP. In addition, the audio processor 513 can output an audio signal from the DSP 507 to the speaker SP. The micro-controller 512 controls the operation of a flash controller 511 in response to a signal from the flash light intensity sensor 19, thereby driving the flash 12.

Figure 5:
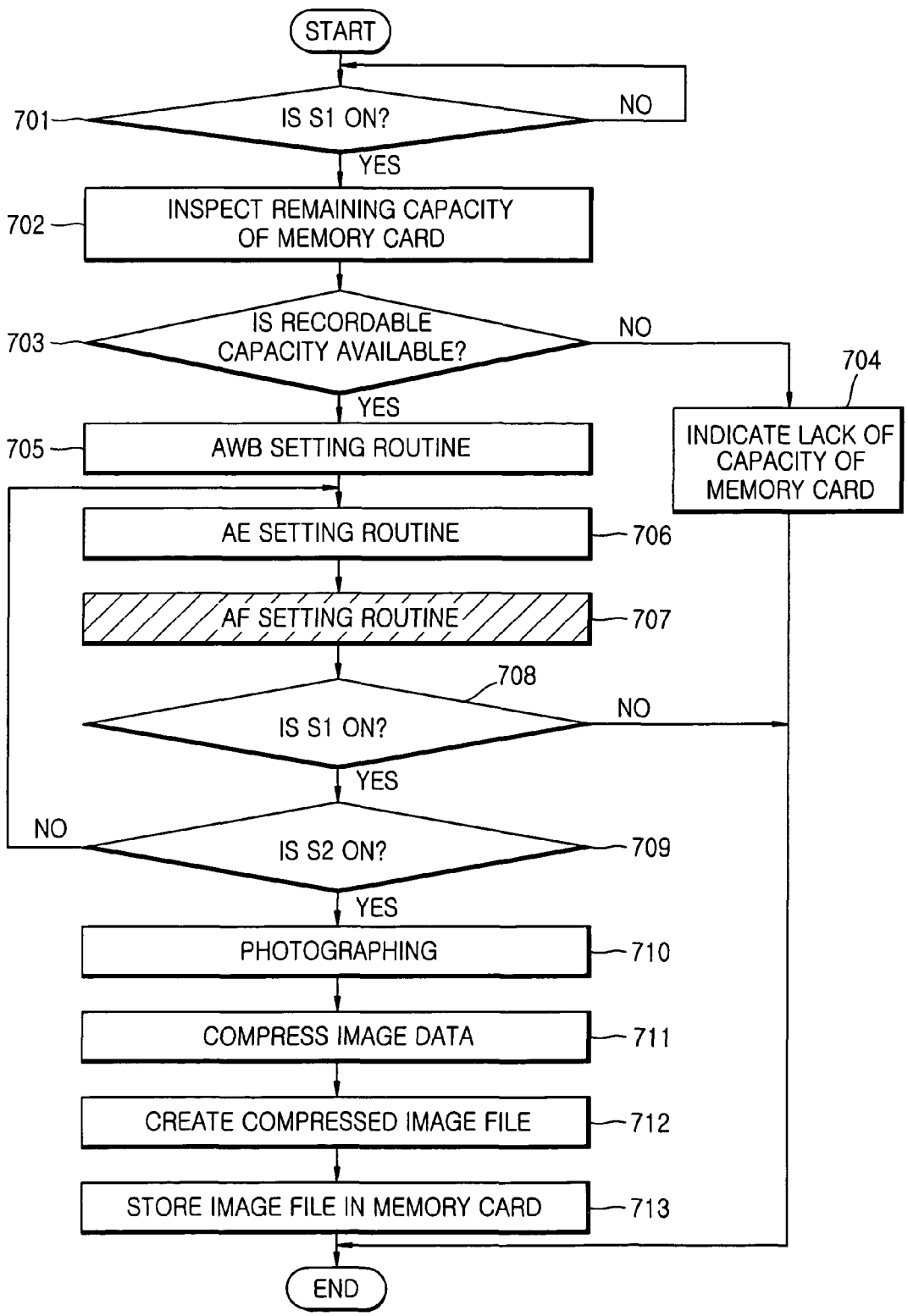
FIG. 5 is a flowchart illustrating a photographing control algorithm of a digital signal processor (DSP) illustrated in FIG. 4.

FIG. 5 is a flowchart illustrating the photographing control algorithm of the DSP 507 illustrated in FIG. 4. The photographing control algorithm of the DSP 507 will now be described with reference to FIGS. 1 through 5. The shutter button 13 included in the INP has two levels. In other words, after operating the wide angle-zoom button $39_W$ and the telephoto-zoom button $39_T$, when a user lightly depresses the shutter button 13 to a first level, a first level signal S1 from the shutter button 13 is turned on.

When the user fully depresses the shutter button 13 to a second level, a second level signal S2 of the shutter button 13 is turned on. Therefore, the photographing control algorithm starts when the first level signal S1 from the shutter button 13 is turned on (operation 701). Here, the current position of the zoom lens ZL is already set.

The DSP 507 inspects the remaining capacity of the memory card (operation 702) and determines whether the memory card has enough capacity for recording a digital image (operation 703). When the memory card does not have enough recordable capacity, the DSP 507 indicates the lack of capacity of the memory card (operation 704). When the memory card has enough recordable capacity, the following steps are performed.

In an automatic white balance (AWB) mode, parameters related to the AWB are set (operation 705). In an automatic exposure mode, the DSP 507 calculates the exposure by measuring incident luminance and drives the aperture driving motor $M_A$ according to the calculated exposure (operation 706).

In the automatic focusing mode, a current position of the focus lens FL is set (operation 707). This automatic-focus (AF) setting routine algorithm will be described in detail with reference to FIGS. 6A and 6B.

It is determined whether the first level signal S1 is on (operation 708). When the first level signal S1 is not on, it means that the user does not wish to take a photograph. Therefore, a photographing operation is terminated. When the first level signal S1 is on, the following steps are performed.

It is determined whether the second level signal S2 is on (operation 709). When the second level signal S2 is not on, it means that the user did not fully depress the shutter button 13 to the second level. Therefore, operation 706 is re-performed.

When the second level signal S2 is on, it means that the user fully depressed the shutter button 13 to the second level. Therefore, the photographing operation is performed (operation 710). In other words, the DSP 507 is operated by the micro-controller 512, and the OEC and the CDS-ADC 501 are operated by the timing circuit 502.

Next, image data is compressed (operation 711), and a compressed image file is created (operation 712). The image file created by the DSP 507 is stored in the user's memory card via the memory card interface 506 (operation 713), and the photographing control algorithm is terminated.

Figure 6A:
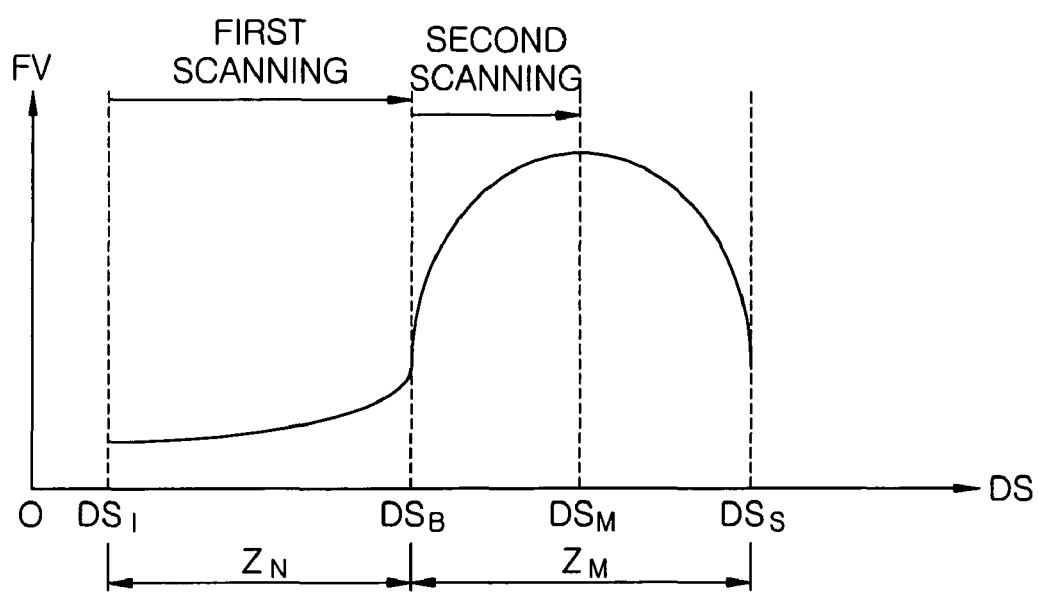
FIG. 6A is a graph illustrating major characteristics of an automatic-focus setting routine (operation 707) illustrated in FIG. 5.

FIG. 6A is a graph illustrating major characteristics of the AF setting routine (operation 707) illustrated in FIG. 5. Referring to FIG. 6A, DS indicates the number of driving steps of the focus lens FL illustrated in FIG. 3, and FV indicates a focus value. Reference numeral $Z_M$ indicates a scanning region in the macro mode for a state in which a subject is within the first distance, for example, 30 cm through 80 cm, from the focus lens FL. Reference numeral $Z_N$ indicates a scanning region in the normal mode for a state in which the subject is beyond the first distance, for example, 80 cm through infinity, from the focus lens FL.

$DS_I$ is the number of driving steps of the focus lens FL corresponding to infinite distance. $DS_B$ is the number of driving steps of the focus lens FL corresponding to a distance of 80 cm from the subject. $DS_M$ is the number of driving steps of the focus lens FL corresponding to a distance having a maximum focus value. $DS_S$ is the number of driving steps corresponding to a distance of 30 cm from the subject. The major characteristics of the AF setting routine algorithm illustrated in FIG. 5 will now be described with reference to FIG. 6A.

If the normal mode is set by the user, the DSP 507 performs first scanning in the scanning region $Z_N$ for the normal mode. If the maximum focus value to be set finally is not acquired in the scanning region $Z_N$, the DSP 507 additionally performs second scanning in the scanning region $Z_M$ for the macro mode.

Conversely, if the macro mode is set by the user, the DSP 507 performs first scanning in the scanning region $Z_M$ for the macro mode. If the maximum focus value to be finally set is not acquired in the scanning region $Z_M$, the DSP 507 additionally performs second scanning in the scanning region $Z_N$ for the normal mode.

Figure 6B:
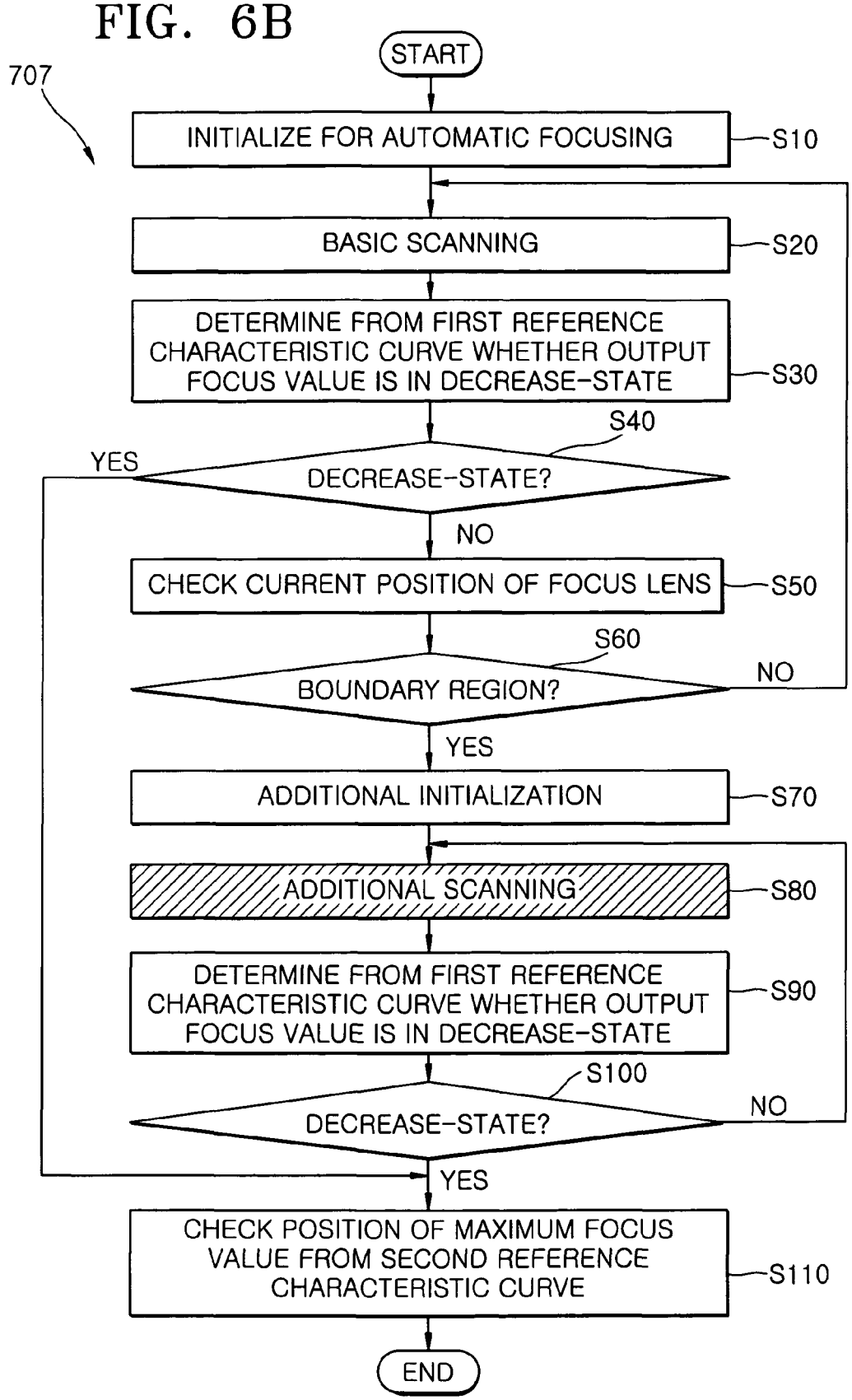
FIG. 6B is a flowchart illustrating the AF setting routine (operation 707) illustrated in FIG. 5.
Figure 7:
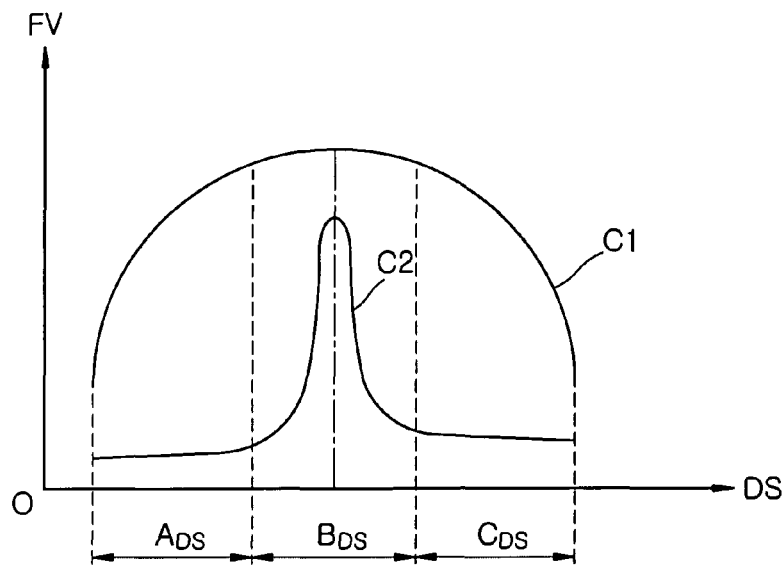
FIG. 7 is a graph illustrating first and second reference characteristic curves used in operations S30, S90, and S10 illustrated in FIG. 6B.

FIG. 6B is a flowchart illustrating the AF setting routine algorithm illustrated in FIG. 5. FIG. 7 is a graph illustrating first and second reference characteristic curves used in operations S30, S90, and S110 illustrated in FIG. 6B. In FIG. 7, DS is the number of driving steps of the focus lens FL, and FV indicates a focus value. C1 is the first reference characteristic curve, and C2 is the second reference characteristic curve. $B_{DS}$ is a region around the maximum focus value to be finally set where the second reference characteristic curve C2 is used. $A_{DS}$ and $C_{DS}$ indicate regions where the first reference characteristic curve C1 is used.

The AF setting routine algorithm illustrated in FIG. 5 will now be described with reference to FIGS. 6B and 7. The DSP 507 is initialized for automatic focusing (S10). The DSP 507 performs basic scanning (S20). If the macro mode is set by a user for the state in which a subject is within a first distance, for example, 30 cm through 80 cm from the focus lens FL, the DSP 507 scans a region corresponding to the first distance. Conversely, if the normal mode is set by the user for the state in which the subject is beyond the first distance, for example, 80 cm through infinity from the focus lens FL, the DSP 507 scans a region beyond the first distance.

During the macro-mode scanning or normal-mode scanning operation included in the basic scanning operation (S20), the DSP 507 outputs a focus value FV proportionate to the amount of high frequency components contained in an image signal per every first number of driving steps of the focus motor $M_F$ (FIG. 4), for example 8 driving steps. Here, the focus motor is a stepping motor. Whenever the focus value FV is output, the maximum focus value FV is updated.

Whenever the focus value FV is output in the basic scanning operation (S20), it is determined from the first reference characteristic curve C1 of FIG. 7 whether the output focus value FV has increased or decreased (S30). Specifically, if the difference between the maximum focus value FV and the output focus value FV as a percentage of the maximum focus value FV is greater than a first reference based on the first reference characteristic curve C1, the DSP 507 determines that the output focus value FV has decreased.

The first reference percentage based on the first reference characteristic curve C1 is low, around 10 to 20 percent, because there is a high probability that the position of a current focus value FV is not around the position of the maximum focus value FV finally set. In this case, the difference between focus values FVs of adjacent positions is low.

If it is determined that the output focus value FV has decreased (S40), the position of the current maximum focus value FV is regarded as the position of the maximum focus value FV in an entire moving range of the focus lens FL. Accordingly, the DSP 507 checks the position of the maximum focus value FV with reference to the second reference characteristic curve C2 of FIG. 7 (S110). In this case, the macro-mode scanning or the normal-mode scanning operation is stopped, and a region around the position of the maximum focus value FV is scanned per every second-number of driving steps, for example, 1 driving step smaller than the first number of driving steps. Thus, the final position of the focus lens FL is set.

Specifically, the DSP 507 outputs a focus value FV, which is proportionate to the amount of high frequency components contained in the image signal, for every driving step of the focus motor $M_F$. Whenever the focus value FV is output, the maximum focus value FV is updated. Whenever the focus value FV is output, it is determined, from the second reference characteristic curve C2 of FIG. 7, whether the output focus value FV has increased or decreased. More specifically, if the difference between the maximum focus value and the output focus value FV as a percentage of the maximum focus value FV is greater than a second reference based on the second reference characteristic curve C2, the DSP 507 determines that the output focus value FV has decreased. If not, the DSP 507 determines that the output focus value FV has increased (see FIG. 10A or 10B).

The second reference percentage based on the second characteristic curve C2 is larger than the first reference percentage because the difference between the focus values FVs of adjacent positions around the position of the maximum focus value FV finally set is large. If it is determined that the output focus value FV has decreased, the position of a current maximum focus value FV is regarded as the position of the maximum focus value FV in the entire moving range of the focus lens FL.

If it is determined in operation S40 that the output focus value FV has increased, the position of the current maximum focus value FV is not regarded as the position of the maximum focus value FV in the entire moving range of the focus lens FL. Accordingly, the following steps are performed.

The DSP 507 determines whether the focus lens FL is positioned in a boundary region (S50). The boundary region denotes a region for the macro-mode scanning or the normal-mode scanning operation in S20. If the focus lens FL is not positioned in the boundary region, the DSP 507 continues to perform the basic scanning operation (S20) and its following steps. If the focus lens FL is positioned in the boundary region, additional scanning is performed.

Specifically, if it is determined that a focus-value FV obtained in the macro-mode scanning operation is not the largest, the normal-mode scanning is additionally performed. Conversely, if it is determined that a focus value FV obtained in the normal-mode scanning operation is not the largest, the macro-mode scanning is additionally performed.

Since additional scanning is performed adaptively in such a way, even if a user fails to select a proper mode between the macro mode and the normal mode, the accuracy of automatic focusing can be improved.

More specifically, the DSP 507 is initialized for additional scanning (S70). The DSP 507 performs the additional scanning (S80). During the macro-mode scanning or normal-mode scanning included in the additional scanning operation (S80), the DSP 507 outputs a focus value FV proportionate to the amount of high frequency components contained in an image signal for every first number of driving steps of the focus motor $M_F$ (FIG. 4), for example 8 driving steps. Whenever the focus value FV is output, the maximum focus value FV is updated.

Whenever the focus value FV is output in the additional scanning operation (S80), it is determined, from the first reference characteristic curve C1 of FIG. 7, whether the output focus value FV has increased or decreased (S90). More specifically, if the difference between the maximum focus value and the current focus value FV as a percentage of the maximum focus value FV is greater than the first reference based on the first reference characteristic curve C1, the DSP 507 determines that the current focus value FV has decreased. If not, the DSP 507 determines that the current focus value FV has increased.

The first reference percentage based on the first reference characteristic curve C1 is as low, around 10 to 20 percent, because there is a high probability that the position of a current focus value FV is not around the position of the maximum focus value FV set finally. In this case, the difference between focus values FVs of adjacent positions is low.

If it is determined that the output focus value FV has decreased (S100), the position of the current maximum focus value FV is regarded as the position of the maximum focus value FV in the entire moving range of the focus lens FL. Accordingly, the DSP 507 checks the position of the maximum focus value in the second reference characteristic curve C2 of FIG. 7 (S110). S110 has been described above.

If it is determined that the output focus value FV has increased (S100), the position of the current maximum focus value FV is not regarded as the position of the maximum focus value in the entire moving range of the focus lens FL. Accordingly, the additional scanning step (S80) and its following steps are performed.

Figure 8:
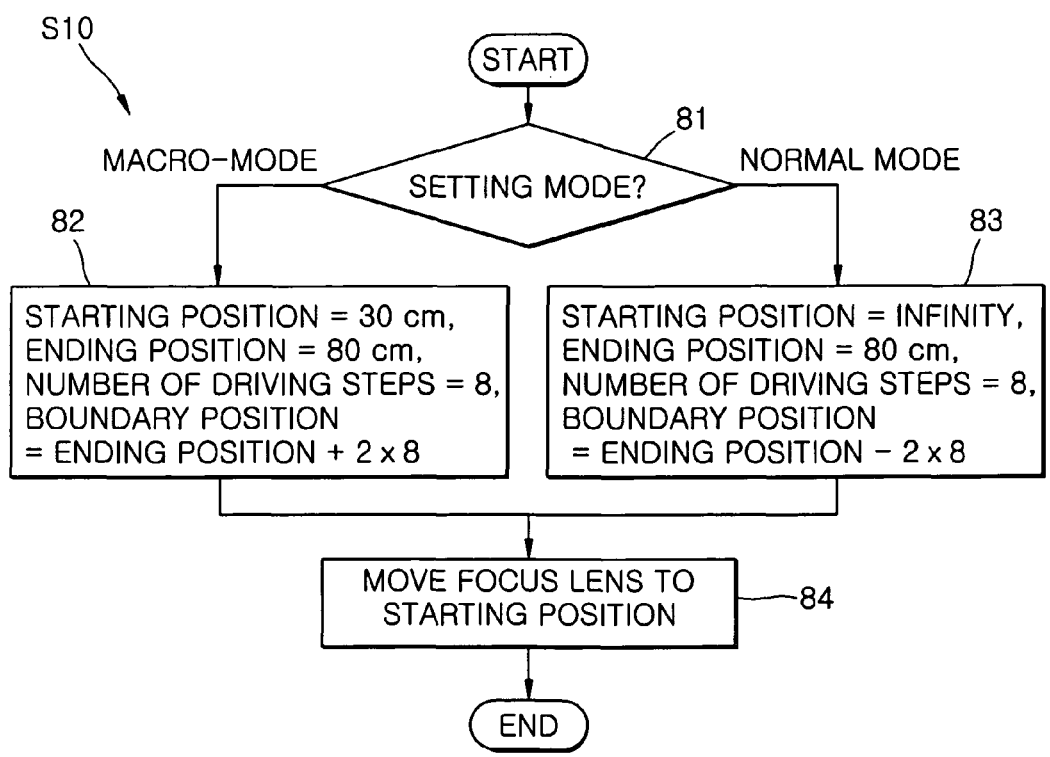
FIG. 8 is a flowchart illustrating operation S10 illustrated in FIG. 6.

FIG. 8 is a flowchart illustrating S10 illustrated in FIG. 6B. Referring to FIG. 8, if the macro mode is set by a user (S81), the number of position steps of the focus motor $M_F$ corresponding to a starting position at which the focus lens FL staffs to move is set to the number of position steps corresponding to 30 cm from a subject. The number of position steps of the focus motor $M_F$ corresponding to an ending position at which the focus lens FL stops moving is set to the number of position steps corresponding to 80 cm from the subject. The number of driving steps of the focus motor $M_F$ is set to 8, and the number of position steps of the focus motor $M_F$ corresponding to the boundary position of the focus lens FL is set to the number of position steps of the focus motor $M_F$ corresponding to the ending position of the focus lens FL plus the number of driving steps (8) times 2 (S82). The boundary position is used in S60 of FIG. 6B.

If the normal mode is set by the user (S81), the number of position steps of the focus motor $M_F$ corresponding to the starting position of the focus lens FL is set to the number of position steps corresponding to infinity from the subject. The number of position steps of the focus motor $M_F$ corresponding to the ending position of the focus lens FL is set to the number of position steps corresponding to 80 cm from the subject. The number of driving steps of the focus motor $M_F$ is set to 8, and the number of position steps of the focus motor $M_F$ corresponding to the boundary position of the focus lens FL is set to the number of position steps of the focus motor $M_F$ corresponding to the ending position of the focus lens FL minus the number of driving steps (8) times 2 (S83). The boundary position is used in S60 of FIG. 6B.

The DSP 507 drives the focus motor $M_F$ using the micro-controller 512 and moves the focus lens FL to the starting position (S84).

Figure 9:
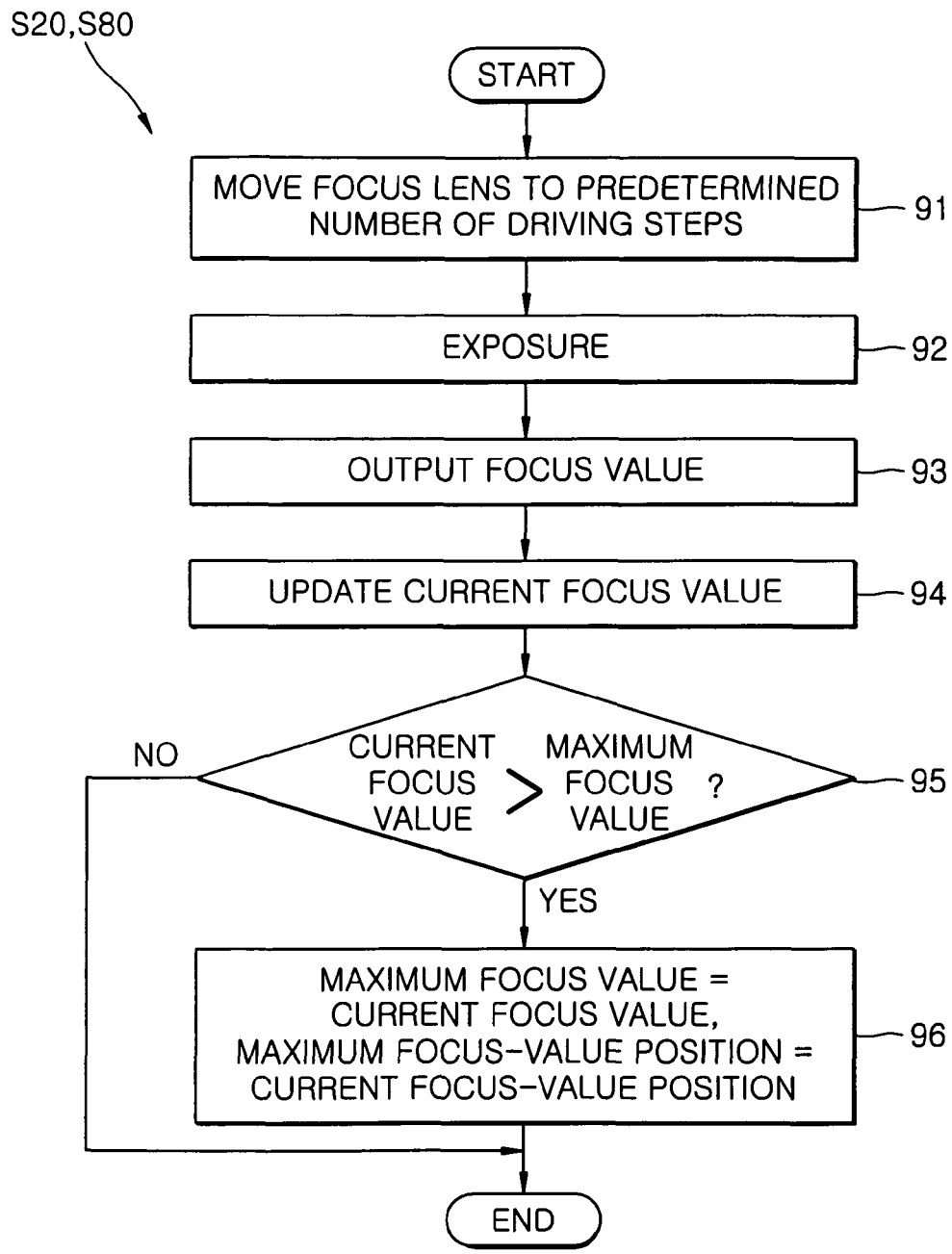
FIG. 9 is a flowchart illustrating operations S20 and S80 illustrated in FIG. 6.

FIG. 9 is a flowchart illustrating S20 and S80 illustrated in FIG. 6B. Referring to FIG. 9, the DSP 507 drives the focus motor $M_F$ by a predetermined number of driving steps using the micro-controller 512, thereby moving the focus lens FL (S91).

The DSP 507 drives the aperture motor $M_A$ using the micro-controller 512 and exposes the OEC of FIG. 4 (S92).

The DSP 507 processes frame data received from the CDS-ADC 501 and outputs a focus value FV that is proportionate to the amount of high frequency components contained in the frame data (S93).

The DSP 507 updates a current focus value FV to the output focus value FV (S94). If the updated current focus value FV is greater than the maximum focus value FV (S95), the DSP 507 updates the maximum focus value FV to the updated current focus value FV and, accordingly, the maximum focus-value position is updated to the current focus-value position (S96).

Figure 10A:
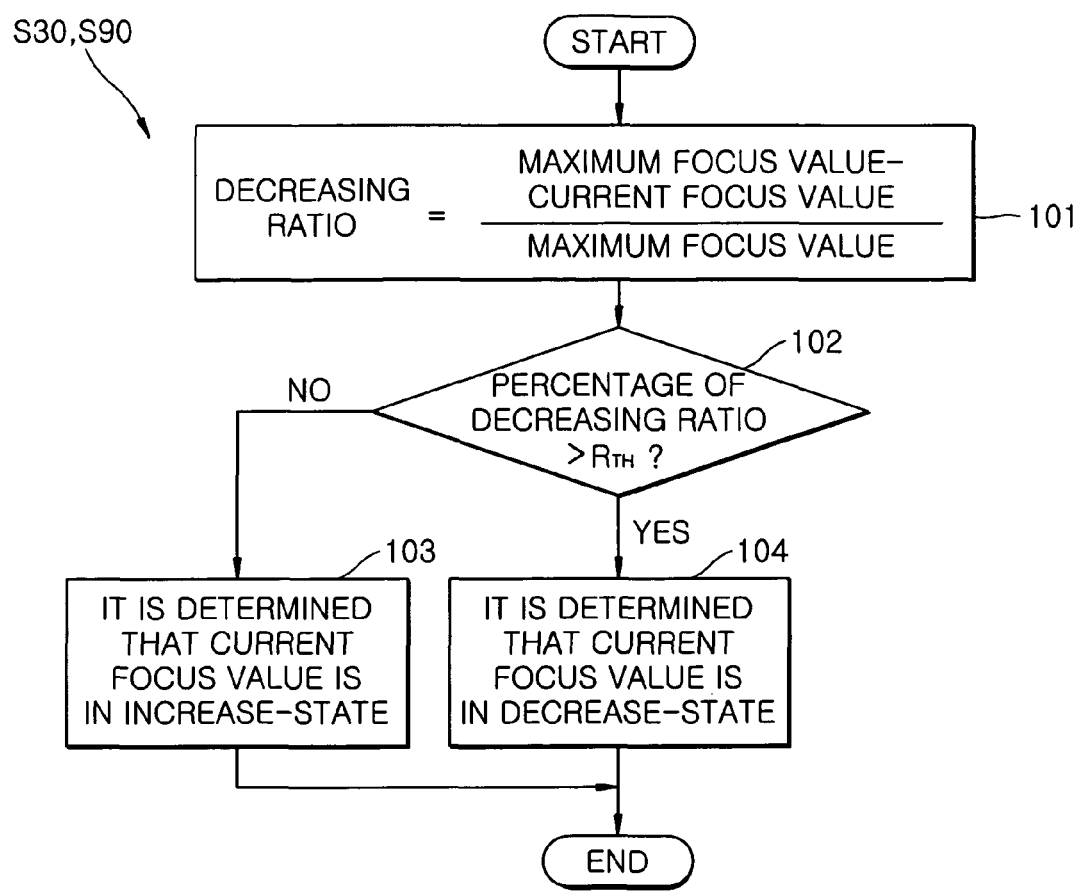
FIG. 10A is a flowchart illustrating operations S30 and S90 illustrated in FIG. 6 according to an embodiment of the present invention.

FIG. 10A is a flowchart illustrating S30 and S90 illustrated in FIG. 6B according to an embodiment of the present invention. Referring to FIG. 10A, the DSP 507 calculates a decreasing ratio of a current focus value FV to a maximum focus value (S101) using 1 Decreasing Ratio=Maximum Focus Value−Current Focus Value Maximum Focus Value (1)

If the decreasing ratio is greater than the first reference $R_{TH}$ of the first reference characteristic curve C1, the DSP 507 determines that the current focus value FV has decreased (S102 and S104). If not, the DSP 507 determines that the current focus value FV has increased (S102 and S103).

Figure 10B:
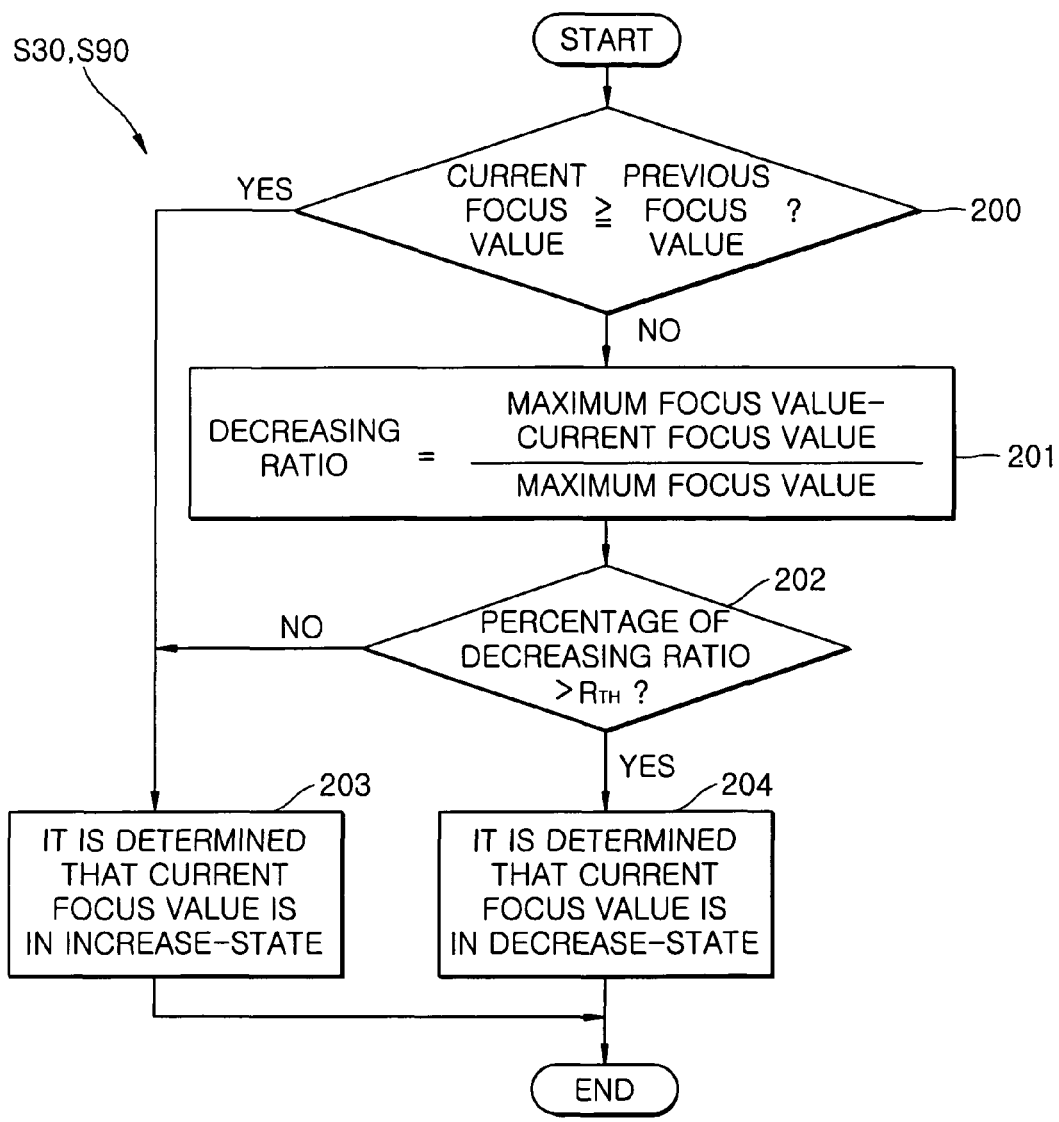
FIG. 10B is a flowchart illustrating operations S30 and S90 illustrated in FIG. 6 according to another embodiment of the present invention.

FIG. 10B is a flowchart illustrating S30 and S90 illustrated in FIG. 6B according to another embodiment of the present invention. The embodiment illustrated in FIG. 10B enables more accurate determination about whether the current focus value FV is in the increase-state or decrease-state than the embodiment illustrated in FIG. 10A.

If the current focus value FV is greater than a previous focus value, the DSP 507 determines that the current focus value FV is in the increase-state and ends S30 and S90 (S200 and S203). If the current focus value FV is less than the previous value, the DSP 507 performs the following step.

The DSP 507 calculates a decreasing ratio using Equation 1 (S201). If the resulting ratio is greater than the first reference $R_{TH}$ of the first reference characteristic curve C1, the DSP 507 determines that the current focus value FV has decreased (S202 and S204). If not, the DSP 507 determines that the current focus value FV has increased (S202 and S203).

Figure 11:
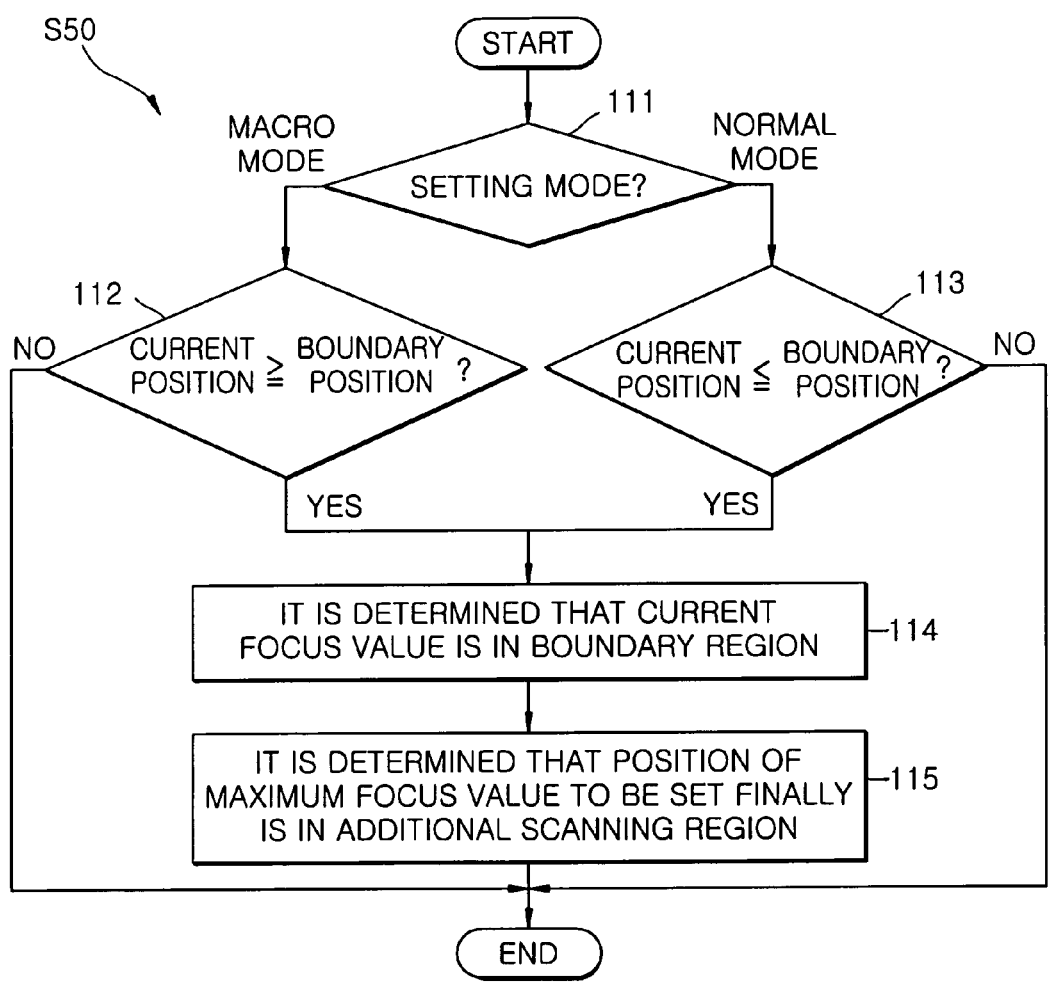
FIG. 11 is a flowchart illustrating operation S50 illustrated in FIG. 6.

FIG. 11 is a flowchart illustrating S50 illustrated in FIG. 6B. Referring to FIG. 11, if the macro mode is set by a user, the DSP 507 compares the number of steps of the focus motor $M_F$ corresponding to a current position with that of the focus motor $M_F$ corresponding to the boundary position (operations 111 and 112). If the number of steps of the focus motor $M_F$ corresponding to the current position is greater than that of the focus motor $M_F$ corresponding to the boundary position, the DSP 507 determines that the current position is in the boundary region (S114) and that the position of a maximum focus value to be set finally is in the additional scanning region (operation 115).

If the normal mode is set by the user, the DSP 507 compares the number of steps of the focus motor $M_F$ corresponding to the current position with that of the focus motor $M_F$ corresponding to the boundary position (operations 111 and 113). If the number of steps of the focus motor $M_F$ corresponding to the current position is greater than that of the focus motor $M_F$ corresponding to the boundary position, the DSP 507 determines that the current position is in the boundary region (S114) and that the position of a maximum focus value to be set finally is in the additional scanning region (operation 115).

Figure 12:
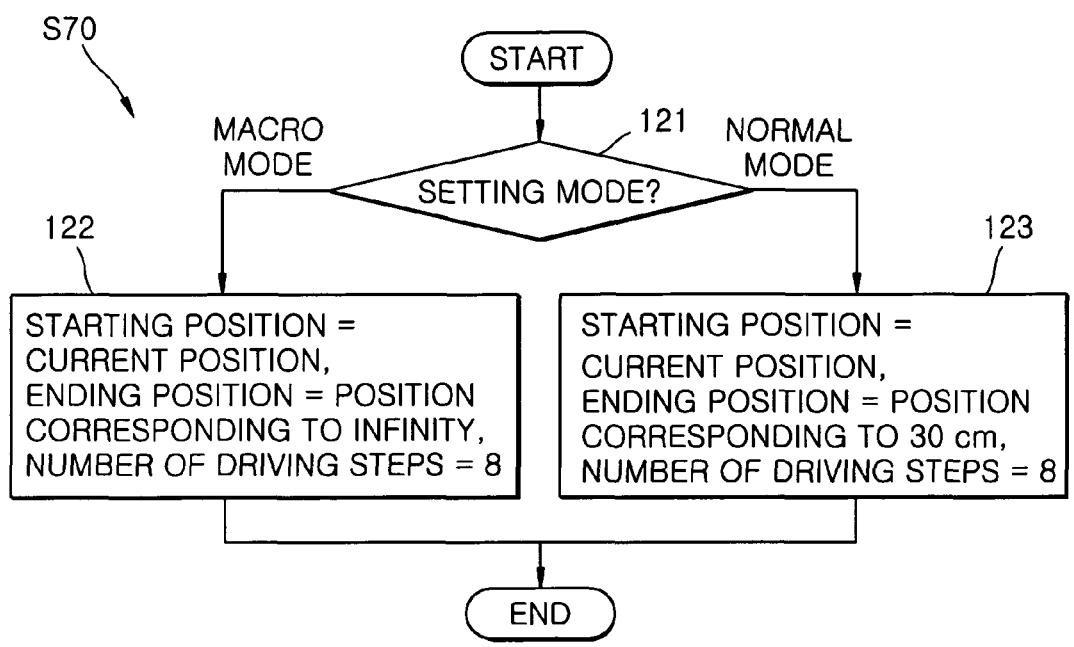
FIG. 12 is a flowchart illustrating operation S70 illustrated in FIG. 6.

FIG. 12 is a flowchart illustrating S70 illustrated in FIG. 6B. Referring to FIG. 12, if the macro mode is set by the user (S121), the number of position steps of the focus motor $M_F$ corresponding to the staffing position at which the focus lens FL staffs to move is set to the number of position steps corresponding to the current position. The number of position steps of the focus motor $M_F$ corresponding to the ending position at which the focus lens FL stops moving is set to the number of position steps corresponding to infinity from the subject. The number of driving steps of the focus motor $M_F$ is set to 8 (operation 122).

If the normal mode is set by the user (S121), the number of position steps of the focus motor $M_F$ corresponding to the starting position of the focus lens FL is set to the number of position steps corresponding to the current position. The number of position steps of the focus motor $M_F$ corresponding to the ending position of the focus lens FL is set to the number of position steps corresponding to 30 cm from the subject. The number of driving steps of the focus motor $M_F$ is set to 8 (operation 123).

As described above, in an automatic focusing method according to the present invention, since additional scanning is performed adaptively, even if a user fails to select a proper mode between the macro mode and the normal mode, the accuracy of automatic focusing can be improved.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An automatic focusing method for a camera in which scanning is performed to find a position of a focus lens having a largest focus value proportional to an amount of high frequency components in an image signal, and a final position of the focus lens is set according to the result of the scanning, the method comprising:
   in a first stage of a scan:
      initializing digital signal processor (DSP) values controlling the first stage of the scan including a boundary position, which is the start of a boundary region, dependent on whether a macro mode or a normal mode is set by a user;
      scanning entirely and solely in a first region within a first distance if the macro mode is set by the user;
      scanning entirely and solely in a second region beyond the first distance if the normal mode is set by the user;
      determining if a focal lens position is within the boundary position; and
      if the focal lens position is within the boundary region, then initializing digital signal processor (DSP) values controlling a second stage of the scan and advancing to the second stare of the scan;
   in the second stage of the scan:
      performing additional scanning in the second region if it is determined that the position of the focus lens found when scanning in the first region does not have the largest focus value when the macro mode is set by the user and while in the macro mode and without the user selecting a proper mode between the macro or the normal modes; and
      performing additional scanning in the first region if it is determined that the position of the focus lens found when scanning in the second region does not have the largest focus value when the normal mode is set by the user and while in the normal mode and without the user selecting a proper mode between the macro or the normal modes.

2. The method of claim 1, wherein scanning in the macro mode and the scanning in the normal mode comprises:

outputting the focus value for each first number of driving steps of a focus motor; and updating a maximum focus value whenever the focus value is output.

3. The method of claim 2, further comprising determining whether the output focus value has increased or decreased whenever the focus value is output.

4. The method of claim 3, wherein, if the difference between the maximum focus value and the output focus value as a percentage of the maximum focus value is greater than a first reference percentage, it is determined that the output focus value has decreased, and, if not, it is determined that the output focus value has increased.

5. The method of claim 4, further comprising:

terminating the scanning in the macro mode or the scanning in the normal mode if it is determined that the output focus value has decreased;

scanning the region around the position of the maximum focus value by a second number of driving steps, which is less than the first number of driving steps; and setting a final position of the focus lens.

6. The method of claim 5, wherein the setting of the final position of the focus lens comprises:

outputting the focus value for the second number of driving steps of the focus motor; and updating the maximum focus value whenever the focus value is output.

7. The method of claim 6, further comprising determining whether the output focus value has increased or decreased whenever the focus value is output.

8. The method of claim 7, wherein if the difference between the maximum focus value and the output focus value based on a percentage of the maximum focus value is greater than a second reference percentage, which is greater than the first reference percentage, it is determined that the output focus value has decreased, and, if not, it is determined that the output focus value has increased.

9. The method of claim 8, further comprising continuing the scanning in the macro mode or the scanning in the normal mode if it is determined that the output focus value has increased.

10. An apparatus for automatically focusing a camera in which scanning is performed to find a position of a focus lens having a largest focus value proportional to an amount of high frequency components in an image signal, and a final position of the focus lens is set according to the result of the scanning, the apparatus comprising:

an input mechanism allowing a user to set either a macro mode or a normal mode of photography prior to taking a picture;

a digital signal processor comprising values for controlling a first stage of a scan including a boundary position, which is the start of a boundary region, dependent on whether a macro mode or a normal mode is set by a user;

a controlling mechanism for, in the first stage of a scan:

scanning entirely and solely in a first region within a first distance if the macro mode is set by the user;

scanning entirely and solely in a second region beyond the first distance if the normal mode is set by the user;

determining if a focal lens position is within the boundary position; and if the focal lens position is within the boundary region, then initializing digital signal processor (DSP) values controlling a second stare of the scan and advancing to the second stare of the scan; and the controlling mechanism in the second stage of the scan:

performs additional scanning in the second region if it is determined that the position of the focus lens found when scanning in the first region does not have the largest focus value when the macro mode is set by the user and while in the macro mode and without the user selecting a proper mode between the macro or the normal modes; and performs additional scanning in the first region if it is determined that the position of the focus lens found when scanning in the second region does not have the largest focus value when the normal mode is set by the user and while in the normal mode and without the user selecting a proper mode between the macro or the normal modes.

11. The apparatus of claim 10, wherein the mechanism for scanning in the macro mode and in the normal mode will:

output the focus value for each first number of driving steps of a focus motor; and update the maximum focus value whenever the focus value is output.

12. The apparatus of claim 11, further comprising a means for determining whether the output focus value has increased or decreased whenever the focus value is output.

13. The apparatus of claim 12, further comprising means for determining whether the output focus value has decreased or increased depending on whether the difference between the maximum focus value and the output focus value as a percentage of the maximum focus value is greater than a first reference percentage.

14. The apparatus of claim 13, further comprising means for terminating the scanning in the macro mode or the scanning in the normal mode if it is determined that the output focus value has decreased, scanning the region around the position of the maximum focus value for every second number of driving steps, which is less than the first number of driving steps, and setting a final position of the focus lens.

15. The apparatus of claim 14, wherein the controller will set the final position of the focus lens by:

outputting the focus value for the second number of driving steps of the focus motor; and updating the maximum focus value whenever the focus value is output.

16. The apparatus of claim 15, further comprising means for determining whether the output focus value has increased or decreased whenever the focus value is output.

17. The apparatus of claim 16, further comprising means for determining whether the output focus value has decreased or increased based on whether the difference between the maximum focus value and the output focus value as a percentage of the maximum focus value is greater than a second reference percentage, which is greater than the first reference percentage.

18. The apparatus of claim 17, wherein the controller will continue the scanning in the macro mode or the scanning in the normal mode if the output focus value has increased.

* * * * *

UNITED STATES PATENT AND TRADEMARK OFFICE
CERTIFICATE OF CORRECTION

PATENT NO. : 7,719,603 B2  Page 1 of 1
APPLICATION NO. : 11/007016
DATED : May 18, 2010
INVENTOR(S) : Byoung-kwon Lee It is certified that error appears in the above-identified patent and that said Letters Patent is hereby corrected as shown below:

In Claim 1, Column 10, lines 45-46, replace "the boundary position" with -- the boundary region --

In Claim 1, Column 10, line 50, replace "stare" with -- stage --

In Claim 10, Column 11, lines 60-61, replace "the boundary position" with -- the boundary region --

In Claim 10, Column 12, line 3, replace "stare" with -- stage --

In Claim 10, Column 12, line 4, replace "stare" with -- stage --

Signed and Sealed this

Thirteenth Day of July, 2010

David J. Kappos
*Director of the United States Patent and Trademark Office*